(12) United States Patent
Caillaud

(10) Patent No.: US 7,499,771 B2
(45) Date of Patent: Mar. 3, 2009

(54) SYSTEM FOR FLIGHT MANAGEMENT

(75) Inventor: Christophe Caillaud, Blagnac (FR)

(73) Assignee: Thales (FR)

( * ) Notice: Subject to any disclaimer, the term of this patent is extended or adjusted under 35 U.S.C. 154(b) by 473 days.

(21) Appl. No.: 10/556,677

(22) PCT Filed: Apr. 29, 2004

(86) PCT No.: PCT/EP2004/050640

§ 371 (c)(1),
(2), (4) Date: Nov. 14, 2005

(87) PCT Pub. No.: WO2004/102121

PCT Pub. Date: Nov. 25, 2004

(65) Prior Publication Data

US 2007/0050098 A1  Mar. 1, 2007

(30) Foreign Application Priority Data

May 16, 2003  (FR)  ................................. 03 05905

(51) Int. Cl.
*G01C 21/00* (2006.01)
(52) U.S. Cl. .......................................... 701/3; 340/961
(58) Field of Classification Search ...................... 701/3,
701/201, 209, 23, 300, 120, 206–208, 200,
701/202; 340/961, 995.17, 995.19, 995.21,
340/995.24
See application file for complete search history.

(56) References Cited

U.S. PATENT DOCUMENTS

| 4,086,632 A | * | 4/1978 | Lions | ........................ 701/210 |
| 4,812,990 A | * | 3/1989 | Adams et al. | .................. 701/3 |
| 5,408,413 A | * | 4/1995 | Gonser et al. | ............... 701/204 |
| 5,842,142 A | | 11/1998 | Murray et al. | |
| 6,522,958 B1 | * | 2/2003 | Dwyer et al. | .................. 701/3 |

OTHER PUBLICATIONS

Bittermann V et al: "Finder, a system providing complex decision support for commercial transport replanning operations" Digital Avionics Systems Conference, 1993. 12th DASC., AIAA/IEEE Fort Worth, TX, USA Oct. 25-28, 1993, New York, NY USA Oct. 25, 1993. pp. 141-146.

* cited by examiner

*Primary Examiner*—Dalena Tran
(74) *Attorney, Agent, or Firm*—Lowe Hauptman Ham & Berner, LLP

(57) ABSTRACT

This flight management system comprises a flight management computer plotting, during the preparation of a flight by the crew, a flight plan with branchoffs from where diversion airport joining trajectories start and which is able, automatically or otherwise, as a function of the situation encountered during the progress of the flight, to substitute for the part of the flight plan remaining to be traversed, one of the diversion airport joining trajectories scheduled during the preparation of the flight plan. It is especially useful in the cases of late change of landing runway.

5 Claims, 2 Drawing Sheets

SYSTEM FOR FLIGHT MANAGEMENT

BACKGROUND OF THE INVENTION

1. Field of the Invention

The present invention relates to assistance with the preparation and with the following of a flight plan taking account of diversion airports and their joining trajectories in respect of aircraft provided with a flight management computer effecting the plotting of a flight plan on the basis of a trajectory skeleton introduced by the crew and consisting of waypoints associated with various constraints on heading, speed, altitude, etc.

2. Description of the Related Art

A crew pilots an aircraft by way of various equipment installed on board the aircraft and termed flight equipment. Such flight equipment is distributed according to three levels as a function of its position in the chain of actuation of the moveable surfaces and of the engines of the aircraft. The first level consists of the flight commands acting directly on the actuators of the movable surfaces and engines. They allow manual piloting. The second level consists of the automatic pilot and/or flight director which act on the flight commands, directly for the automatic pilot and by way of the pilot for the flight director, and which allow the pilot to slave the aerodyne to a quantity related to the trajectory of the aircraft: attitude, heading, slope, route, altitude, speed, deviations with respect to routes, etc. The third level consists of the flight management computer which acts on the automatic pilot and/or flight director and which allows the pilot to plot a flight plan and to more or less automatically follow the flight plan adopted.

The plotting of a flight plan by a flight management computer is done on the basis of a trajectory skeleton introduced by the crew and consisting of waypoints associated with various constraints on heading, altitude, speed, etc. By applying preprogrammed construction rules, the flight management computer constructs a route to be followed, on the basis of a chaining together of segments linking the waypoints together in pairs from the departure point to the arrival point and of circular arc transitions at the level of the waypoints for the changes of heading between segments.

During the preparation and the plotting of a flight plan, the crew of an aircraft have a duty to ensure maximum safety of the mission by taking account of the most common vagaries that may require an unscheduled stopover or a diversion such as engine problems at takeoff dealt with according to an EOSID procedure (the acronym standing for the expression "Engine Out Standard Instrument Departure"), engine problems while cruising that give rise for twin-engines to restrictions of movement that are imposed by an ETOPS procedure (the acronym standing for the expression "Extended Twin OperationS"), problems of lack of fuel, of unexpected change of airport runway in use, of unavailability of the destination airport, etc.

It is known, in particular through American patents U.S. Pat. Nos. 5,842,142, and 5,398,186 to facilitate the work of a crew in taking account of a diversion airport in case of closure of the destination airport or of emergency situation, by calling upon an onboard database or one which is accessible by radio transmission from the aircraft, cataloging the diversion landing fields, upon an interface for programming the flight management computer termed the MCD (the acronym standing for the expression "Multipurpose Control Display") displaying, on request by the crew, a list of diversion airports ranked as a function of their proximities to the current position of the aircraft and, after selection, by the crew, of one of the diversion airports proposed, a proposal of a choice of trajectories for joining the diversion airport selected on the basis of the current position of the aircraft, which are calculated by the flight management computer.

This aid alleviates the work of a crew in the case of an incident in the course of a flight justifying a diversion but it demands that the crew program the flight computer while at the same time having to ward off the consequences of the incident that has occurred.

It is also known, in particular through American patent U.S. Pat. No. 6,519,527, to facilitate the plotting by the crew of an aircraft of a flight plan complying with an ETOPS procedure, by calling upon an onboard database or one accessible by radio transmission cataloging the landing fields placed in proximity to the route of the aircraft between its departure point and its destination, and by having the flight management computer determine a band linking the departure point of the aircraft to its destination point, in which band the trajectory of the flight plan must be situated in order for the aircraft to remain constantly at a distance from an emergency airport cataloged in the database, which is less than that prescribed by the ETOPS procedure.

SUMMARY OF THE INVENTION

The present invention is aimed at assistance to the preparation of a flight plan for the crew of an aircraft provided with a flight management computer, facilitating the taking into account of diversion airports and their joining in case of vagaries while minimizing the work load of the crew upon the occurrence of a flight incident.

Its subject is a flight management system for aircraft providing the crew of the aircraft with information on diversion airport joining trajectories staggered along the path of the aircraft. This flight management system is provided with a flight management computer plotting a flight plan on the basis of a trajectory skeleton consisting of a series of waypoints associated with various flight constraints such as constraints on heading, altitude, speed, etc, introduced by the crew, individually or in subsets. It is noteworthy in that it comprises a database of redirection points, accessible from the aircraft, cataloging associations of waypoints, and of skeletons of trajectories for joining diversion airports starting from these waypoints termed redirection points, and a decision engine activating, under particular flight conditions, a modification of the flight plan followed by the flight management computer consisting in following a trajectory for joining a diversion airport, said trajectory being constructed on the basis of the information stored in the database of redirection points.

Advantageously, the particular flight conditions to be complied with in order to activate a modification of the flight plan when the aircraft passes through a redirection point are defined by the crew of the aircraft at the time of the preparation of the flight plan.

Advantageously, the particular flight conditions to be complied with in order to activate a modification of the flight plan when the aircraft passes through a redirection point are stored in the data memory cataloging the redirection points in association with each trajectory skeleton leading from one of these redirection points to a diversion airport.

Advantageously, the decision engine asks for the prior agreement of the crew of the aircraft in order to perform a modification of the flight plan in progress.

Advantageously, the choice made by the decision engine may be prescribed by the crew of the aircraft.

Other characteristics and advantages of the invention will become apparent from the description hereinbelow of an embodiment given by way of example.

BRIEF DESCRIPTION OF THE DRAWINGS

This description will be offered in conjunction with the drawing in which.

DETAILED DESCRIPTION OF THE EMBODIMENTS

Figure 1:
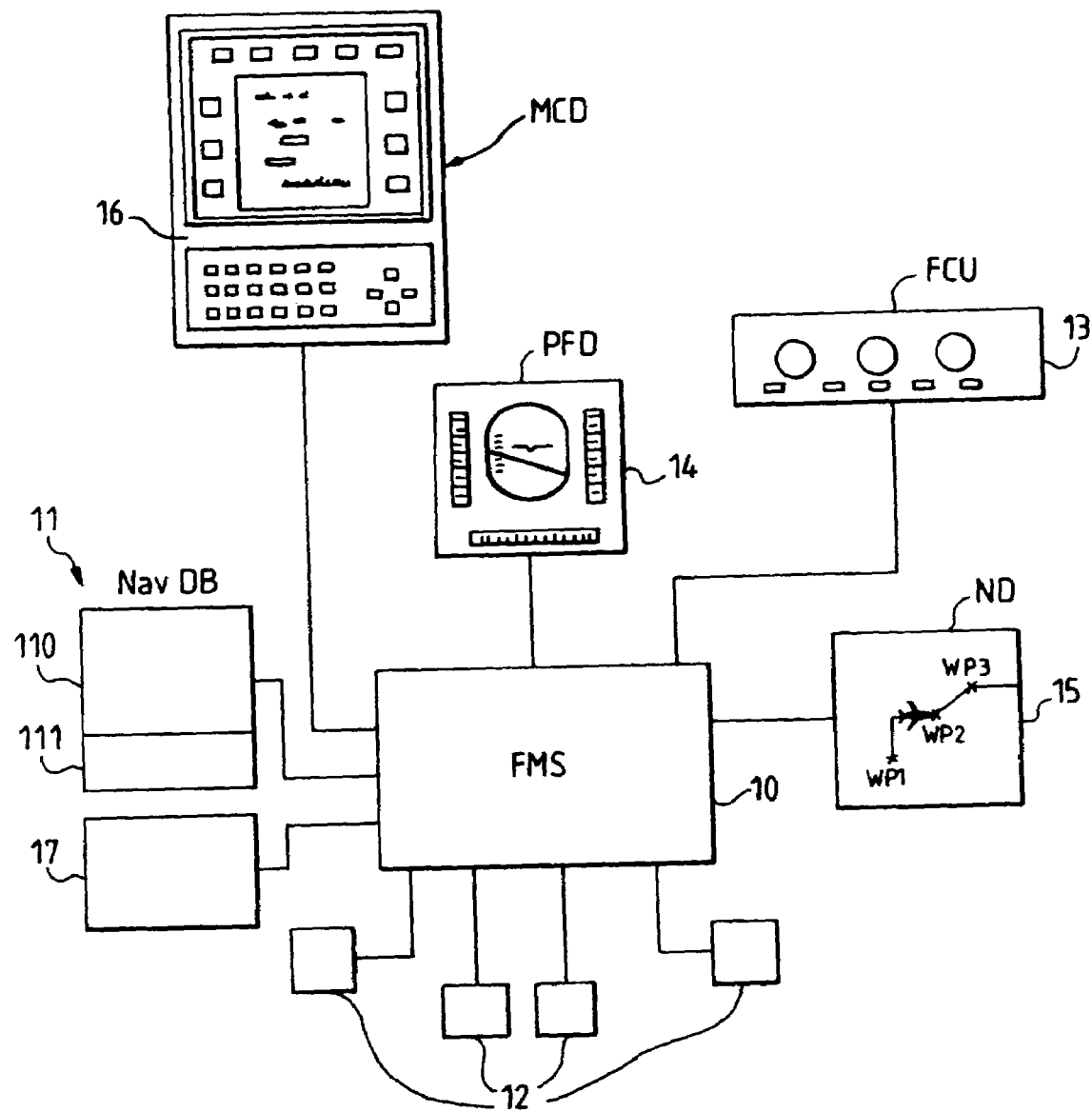
FIG. 1 represents the configuration of a flight management system for aircraft making it possible to implement the method according to the invention.

As shown in FIG. 1, an onboard flight management system comprises an FMS flight management computer 10. The latter exchanges various information with a navigation database 11 termed NavDB (the acronym standing for "Navigation Database"), with a database of redirection points 17 and with other equipment 12 of the aircraft. It communicates with the crew of the aircraft by way of man/machine interfaces among which are chiefly:

- an FCU control panel 13 with switches, buttons, displays and indicator lights allowing the selection and customization of the principal modes of operation of the FMS computer 10 and of the automatic pilot and/or flight director on which the FMS computer 10 acts but which is not represented so as not to needlessly overburden FIG. 1.
- a PFD primary flight display 14 used to display an artificial horizon, and flight parameters such as the altitude of the aircraft, its attitude, its speed vector, an indication of the mode of guidance, etc,
- an ND navigation display 15 for displaying maps, the flight plan, etc.,
- an MCD display and input console 16 having a keypad and a screen surrounded by function keys, and constituting the main instrument of dialogue with the FMS computer 10.

The FMS computer 10 assists the crew of an aircraft in the definition of the flight plan before takeoff and in the following of the flight plan from takeoff up to landing. Its assistance in the definition of the flight plan consists in simplifying for the crew, the plotting, in the horizontal and vertical planes, of the trajectory that the aircraft will have to follow in order to fulfill its mission while reducing this plotting operation, as far as the crew is concerned, merely to the definition of a trajectory skeleton formed of a succession of waypoints associated with various flight constraints such as altitude, speed, heading or the like. During the preparation of the flight plan, the crew enter into the FMS computer 10, by means of the MCD console 16, in an explicit or implicit manner, the geographical coordinates of the waypoints and the flight constraints associated therewith and obtain from the FMS computer 10 a flight plan constructed on the basis of a chaining together of segments linking the waypoints in pairs from the departure point up to the destination point and of circular arcs effecting the transitions of heading between segments at the level of the waypoints, flight plan which is displayed on the ND navigation display 15 to allow the crew to verify its relevance.

The navigation database NavDB 11, which is onboard or accessible by radio transmission from the flight management computer of the aircraft, catalogs at 110, in a set of files individual to the names of navigation procedures that the aircraft may be obliged to comply with in its customary deployment space, skeletons of pieces of trajectories (series of waypoints with the associated flight constraints) necessary for the flight management computer to plot flight plan portions in accordance with the pertinent navigation procedures. It may even catalogue, at 111, in a set of files individual to the names of flight plans, skeletons of trajectories corresponding to flight plans predefined by the airline operating the aircraft.

The MCD console 16 allows the crew to introduce the plotting data of a flight plan into the FMS computer 10, either at the elementary level of the waypoints and of the flight constraints associated with the waypoints, or at the intermediate level of the navigation procedures which make it possible to re-enter into the FMS computer 10 sequences of plotting data involving portions of the flight plan that are stored in the navigation database NavDB 11, or else, at the overall level of the flight plan itself by calling upon the plotting data of a complete flight plan likewise stored in the navigation database NavDB 11.

With a view to facilitating, in the course of the flight, a diversion to a substitute airport, it is proposed, during the preparation of the flight plan, to plot, on the trajectory normally followed by the aircraft during its mission, various branchoffs which lead to diversion airports within range of which the aircraft passes when it follows its normal trajectory and which the aircraft may possibly be able to follow with the aid of its flight management computer 10 in case a problem justifying a diversion should occur, such as an engine fault on takeoff implying the following of an EOSID procedure, an engine fault while cruising, the possibility of which implies the following by twin-engines of an ETOPS procedure, a need for refueling, a late change of landing runway in use, a sudden unavailability of the destination airport due, for example, to poor meteorological conditions.

For the plotting of a flight plan with branchoffs leading to diversion airports, the flight management computer 10 relies both on the navigation database 11 and on the database of redirection points 17 which encompasses skeletons of trajectories for joining the diversion airport starting from particular waypoints termed redirection points. Upon the introduction of a flight plan skeleton by the crew, the flight management computer 10 analyzes, with the aid of the database of redirection points 17, the nature of the waypoints introduced by the crew, those having the quality of redirection points implying the automatic addition, at their levels on the trajectory of the flight plan, of branchoffs leading to diversion airports.

Figure 2:
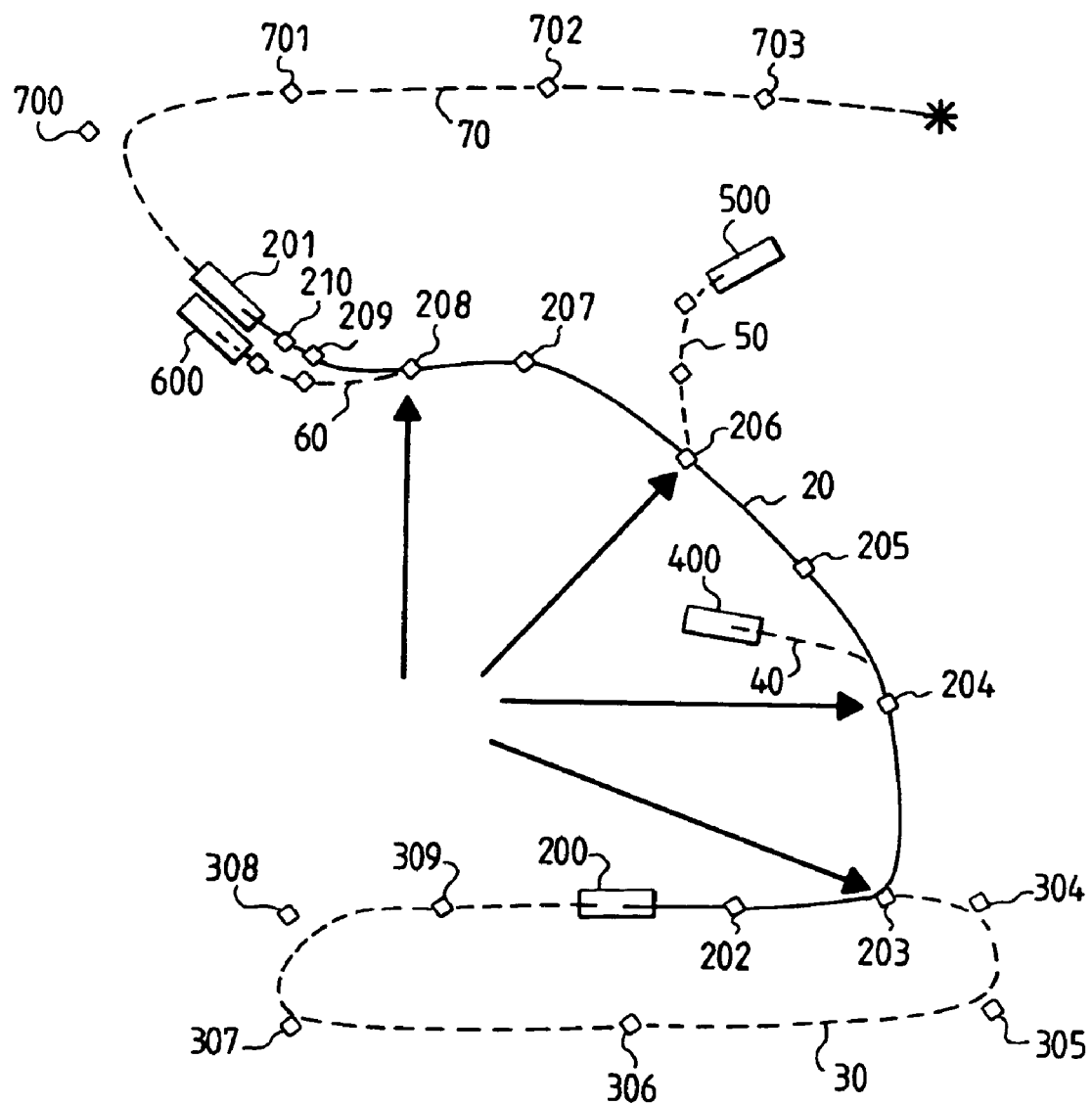
FIG. 2 represents an exemplary plot of flight plan in accordance with the invention.

FIG. 2 gives an exemplary plot, in the horizontal plane, of a flight plan with branchoffs leading to diversion airports and starting from prescribed waypoints corresponding to redirection points.

On mission departure, the aircraft crew's instructions, valid in the absence of any incident, are to take off from the takeoff runway 200 of a departure airport and proceed to the runway 201 of a destination airport, passing above or in the neighborhood of a succession of prescribed waypoints 202 to 210. In case of an engine fault on takeoff, their instructions are to cancel the mission and to bring the aircraft back down as soon as possible while following an EOSID procedure which consists, in the case of this FIG. 2 of a return to the takeoff runway 200 of the departure airport while following a path for setting safety conditions for landing defined by another succession of prescribed waypoints 202, 203, 304 to 309. In case of problems in the course of the flight justifying an unscheduled stopover, such as a lack of fuel, an engine problem during cruising flight, a passenger problem, etc. they have the possibility of coming down at the start of the mission on the landing runway 400 of a first diversion airport and two thirds of the way through their mission on the landing runway 500 of a second diversion airport. In case of unavailability of the runway 201 initially scheduled for landing at the destination airport, their instruction is to use a replacement landing runway 600 of the destination airport. Finally, in case of unforeseen closure of their destination airport, their instructions are to continue their flight to an alternate airport by following a path defined by a succession of prescribed waypoints 700, 701, 702 703, etc.

During the preparation of the flight plan, the crew enters into the flight management computer, by means of the MCD man/machine interface 16, the coordinates of the takeoff runway 200 of the departure airport, of the successive waypoints 202 to 210, of the landing runway 201 of the destination airport 201, and the associated flight constraints which constitute a trajectory skeleton on which the flight management computer 10 relies for plotting in the horizontal plane and in the vertical plane (not represented), the trajectory 20 which will normally be followed by the aircraft in the absence of vagaries. The flight management computer displays the plot obtained for approval by the crew. Then, performs the following of the plot accepted by the crew.

Only the trajectory 20 normally followed by the aircraft, in the absence of vagaries, in order to fulfill its mission is plotted in the horizontal plane and in the vertical plane by the flight management computers of the prior art. However, given the ever greater computational power of flight management computers, it has been sought to augment the aid they afford to the crew in the management of the flight by extending their actions in cases of difficult situations justifying a diversion. Thus, certain flight management computers provide for an additional function of automatic following of an EOSID trajectory in case of an engine fault on takeoff. Others allow a crew, by means of a fairly unwieldy customization procedure requiring recourse to an MCD man/machine interface 16, to select during flight an alternate airport to which they plot a route from the instantaneous position of the aircraft which they are capable of following automatically after approval from the crew. However, even with these flight management computers, a change of destination in case of diversion remains a relatively unwieldy operation for a crew in a tense context.

The flight management system proposed with its database 17 of redirection waypoints associated with diversion airport joining trajectory skeletons allows its flight management computer 10 to plot the trajectory 20 normally followed by the aircraft, supplemented, at the waypoints which turn out to be redirection waypoints, with branchoffs leading to diversion airports. Thus, the first redirection waypoint encountered 203 is the start of a trajectory 30 for returning to the runway used on takeoff complying with the EOSID procedure established for this runway. The second redirection waypoint encountered 204 is the start of a trajectory 40 for joining the diversion airport 40. The third redirection waypoint encountered 206 is the start of a trajectory 50 for joining another diversion airport 50. The fourth diversion waypoint encountered 208 is the start of a trajectory 60 for joining a replacement landing runway 600 and of a trajectory 70 for joining a diversion airport.

During automatic or nonautomatic following of such a flight plan, the crew of the aircraft grappling with a flight situation requiring a diversion is offered at least one ready-made solution which they merely have to approve in order for it to be implemented at the next redirection waypoint encountered.

According to a preferred variant, the redirection waypoints are cataloged in the database 17, and are associated not only with flight constraints and at least one trajectory skeleton for joining a diversion airport but also with conditions of activation of each diversion airport joining trajectory that are modifiable by the crew and the flight management computer 10 is provided with a decision engine which is activated when the aircraft passes above or in proximity to each redirection waypoint and which decides, as a function of compliance or otherwise with the activation conditions associated with the redirection waypoint concerned, on the following of a trajectory for joining a diversion airport or on the continuation of the normal flight plan. The automatic conditions of activation of a trajectory for joining a diversion airport may be an engine fault, an arrival time outside of a given slot, an insufficient quantity of fuel on board, etc.

During the preparation of the flight plan, the introduction by the crew into the flight management computer 10, by way of the MCD man/machine interface 16, of the series of prescribed waypoints forming the skeleton of the flight plan which is effected in an elementary manner, the crew entering one by one the compulsory waypoints and the associated flight constraints, or more or less global, the crew entering groupings of prescribed waypoints with the associated flight constraints corresponding to pieces of skeletons of trajectories or even to a complete trajectory skeleton, is accompanied, on the part of the flight management computer with a request to accept or to modify the conditions of activation of each diversion airport joining trajectory that are associated with each redirection waypoint accepted.

Such a flight plan with branchoffs of optional trajectories for joining diversion airports is especially suitable for an ETOPS flight, for a flight with optional technical stopovers, for taking into account an EOSID procedure to an airport which may be the takeoff one or another one nearby. It also offers a simple alternative to the regulatory substitute aerodrome.

One way of facilitating the preparation of a flight plan consists in calling upon, for the construction of the skeleton of the flight plan, trajectory skeleton pieces stored in the navigation memory, which are delimited by redirection waypoints and short enough for a redirection waypoint to always be within reasonable range if a situation justifying a diversion occurs suddenly during flight.

Of course, the crew can manually select a trajectory for joining a diversion airport before the aircraft has reached the redirection waypoint constituting its branchoff from the flight plan and they retain the option to revert to such a selection as long as the aircraft has not reached this redirection waypoint. The manual activation of a trajectory for joining a diversion airport is effected as simply as the activation of an alternate flight plan.

In the same way, the crew have, during the flight, the possibility of modifying a diversion airport joining trajectory predefined during the preparation of the flight plan but this presupposes that the situation justifying the diversion allows them to devote part of their attention to the customization of the modification in the flight management computer.

The flight management system just described may also comprise a function for searching for the diversion airports nearest (in terms of flight time, not necessarily of distance) to a segment of the flight plan relying on a diversion airport directory cataloged in the navigation database.

One of the most interesting applications of the flight management system just described is the possibility of multiple late changes of landing runway. Indeed it may carry out automatically, immediately upon the approval by the crew of a change of landing runway, the selection of the correct frequency of the ILS guidance system and the following of the sidestep for joining the new runway already computed during the preparation of the flight plan.

The invention claimed is:

1. A flight management system for aircraft providing a crew of the aircraft with information on diversion airport joining trajectories staggered along the path of the aircraft, said flight management system comprising:

a flight management computer for plotting a flight plan on the basis of a trajectory skeleton having a series of waypoints associated with various flight constraints on heading, altitude, speed, introduced by the crew, individually or in subsets, a redirection point database accessible from the aircraft, cataloging associations of waypoints, and of skeletons of trajectories for joining diversion airports starting from said waypoints termed redirection points, and providing links between previous said waypoints and said skeletons of trajectories, and a decision engine activating, when the aircraft passes above or in proximity to the redirection point and under particular flight conditions, a modification of the flight plan followed by the flight management computer for following said trajectory for joining a diversion airport associated with said redirection point, said trajectory being constructed on the basis of the information stored for said redirection point in the redirection point database.

2. The system as claimed in claim 1, wherein the particular flight conditions to be complied with in order to activate the modification of the flight plan when the aircraft passes through the redirection point are defined by the crew of the aircraft at the time of the preparation of the flight plan.

3. The system as claimed in claim 1, wherein the particular flight conditions to be complied with in order to activate the modification of the flight plan when the aircraft passes through the redirection point are stored in the redirection point database in association with each trajectory skeleton leading from one of these redirection points to the diversion airport.

4. The system as claimed in claim 1, wherein the decision engine asks for the prior agreement of the crew of the aircraft in order to perform the modification of the flight plan in progress.

5. The system as claimed in claim 1, wherein the choice made by the decision engine when the aircraft passes through the redirection point may be prescribed by the crew of the aircraft.

* * * * *